US009565839B2

(12) United States Patent
Lipscomb

(10) Patent No.: US 9,565,839 B2
(45) Date of Patent: Feb. 14, 2017

(54) SUPPORT ARRANGEMENT FOR SOFT SIDED AQUARIUM

(71) Applicant: Pioneer Pet Products, LLC, Cedarburg, WI (US)

(72) Inventor: John M. Lipscomb, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 89 days.

(21) Appl. No.: 14/338,346

(22) Filed: Jul. 22, 2014

(65) Prior Publication Data
US 2015/0020746 A1 Jan. 22, 2015

Related U.S. Application Data

(60) Provisional application No. 61/857,209, filed on Jul. 22, 2013.

(51) Int. Cl.
*A01K 63/00* (2006.01)
(52) U.S. Cl.
CPC ........ *A01K 63/003* (2013.01); *Y10T 29/49826* (2015.01)
(58) Field of Classification Search
CPC .............................. A01K 63/00; A01K 63/003
USPC .............. 119/203, 245, 269; 43/54.1, 55–57; 220/662, 665–667, 9.1–9.3, 4.28
See application file for complete search history.

(56) References Cited

U.S. PATENT DOCUMENTS

| 2,313,607 A | 4/1943 | MacDonald |
| 2,652,807 A | 9/1953 | Washburn |
| 2,949,882 A | 8/1960 | Thomas, Jr. |
| 3,168,887 A | 2/1965 | Bodell |
| 3,316,882 A | 5/1967 | Renwick |
| 3,565,041 A | 2/1971 | Brooks |
| 3,658,035 A * | 4/1972 | Harris ................. A01K 63/003 119/269 |
| 4,034,710 A | 7/1977 | Carter |

(Continued)

FOREIGN PATENT DOCUMENTS

| EP | 0 962 387 | 12/1999 |
| FR | WO 9412023 A1 * | 6/1994 ........... A01K 63/003 |

(Continued)

OTHER PUBLICATIONS

International Search Report dated Oct. 30, 2014 in corresponding PCT application (PCT/US2014/047710).

*Primary Examiner* — Danielle Clerkley
(74) *Attorney, Agent, or Firm* — Boyle Fredrickson S.C.

(57) ABSTRACT

An aquarium with a flexible side wall includes a support arrangement. The support arrangement can include a lower support that serves as a base and an upper support capturing an upper edge of the flexible side wall to distribute forces applied to the upper edge of flexible side wall so that a force applied to a discrete location to the side wall is distributed across a relatively larger portion of the side wall than at the discrete location for preventing localized buckling of the side wall preventing spilling. The support arrangement includes an upper support formed of a ring and a ring-shaped insert received in a cavity of the ring providing opposing support surfaces engaging an upper portion of the flexible side wall. In a preferred embodiment, the ring and ring-shaped insert nest to clamp part of the side wall therebetween.

29 Claims, 11 Drawing Sheets

(56) References Cited

U.S. PATENT DOCUMENTS

| | | | | |
|---|---|---|---|---|
| 4,040,461 A | * | 8/1977 | Carson | B65D 25/14 |
| | | | | 206/515 |
| 4,146,989 A | | 4/1979 | Vanus et al. | |
| 4,858,755 A | | 8/1989 | Kuivanen | |
| 5,960,983 A | * | 10/1999 | Chan | B65F 1/02 |
| | | | | 220/489 |
| 6,554,149 B2 | * | 4/2003 | Schneider | A45C 7/0077 |
| | | | | 220/666 |
| 2010/0320203 A1 | * | 12/2010 | Moodie | B65D 88/18 |
| | | | | 220/9.3 |
| 2012/0168436 A1 | * | 7/2012 | Wang | B65D 25/16 |
| | | | | 220/9.2 |

FOREIGN PATENT DOCUMENTS

| | | | | |
|---|---|---|---|---|
| HK | GB 2342267 A | * 4/2000 | | A01K 63/003 |
| RU | 2038815 | 7/1995 | | |

* cited by examiner

SUPPORT ARRANGEMENT FOR SOFT SIDED AQUARIUM

CROSS REFERENCE

This application claims priority in U.S. Provisional Patent Application No. 61/857,209 filed Jul. 22, 2013 under 35 U.S.C. §119(e), the entirety of which is expressly incorporated herein by reference.

FIELD

The present invention is directed to aquariums and more particularly to an aquarium with a flexible side wall(s).

BACKGROUND

Aquariums with flexible walls are known. Some aquariums have flexible walls that can collapse when empty and require water inside the aquarium to push outwardly against the side walls to maintain in-use forms of the aquariums.

SUMMARY

The present invention is directed to an aquarium that has a flexible side wall that may be at least partially self-supporting when the aquarium is empty and has a support arrangement for stabilizing at least an upper portion of the flexible side wall.

The support arrangement may be arranged with respect to inner and outer surfaces of an upper portion flexible side wall for supporting the upper portion in opposing directions transverse with respect to a longitudinal axis of the flexible side wall. The support arrangement may be arranged with respect to the side wall so that a force applied to a discrete location to the side wall is distributed by the support arrangement across a relatively larger segment of the side wall than at the discrete location for preventing localized buckling of the side wall and maintaining water in the aquarium.

The flexible side wall may be self-supporting so as to self-restore to a resting position when flexed away from the resting position. The flexible side wall may be flexible from a resting position inwardly toward a longitudinal axis of the aquarium and downwardly from the resting position toward the base and may resiliently restore to the resting position when flexed inwardly or downwardly. The flexible side wall may restore to the resting position when flexed away from the resting position.

The support arrangement may include first and second support surfaces arranged on opposing sides of the flexible side wall for limiting movement of the upper portion of the flexible side wall in the opposing directions. The support arrangement may include a ring having an inner wall defined inwardly of the inner surface of the upper portion of the flexible side wall and an outer wall defined outwardly of the outer surface of the upper portion of the flexible side wall. At least one of the first and second support surfaces may be defined by the ring. This may stabilize an upper portion of the flexible side wall with a support arrangement that can be easily installed upon the upper portion of the flexible side wall.

The support arrangement may include at least one insert for inserting between the inner and outer walls of the ring to define a space to receive the flexible side wall. The at least one insert may define a single unitary insert extending about an entire periphery of the flexible side wall. One of the first and second support surfaces may be defined by the ring and the other one of the first and second support surfaces is defined by the at least one insert, which may be multiple inserts spaced from each other about the periphery of the flexible side wall. This may allow for hooking or capturing the upper portion of the flexible side wall at multiple locations or continuously around the periphery of the flexible side wall.

The support arrangement may include at least one blind bore and at the least one bore aligned with each other for receiving a fastener to secure the at least one insert and the ring with respect to each other. The blind bore may be defined in a post at one of the ring and the insert and may extend toward the other one of the ring and the insert. The support arrangement may define a counter bore receiving the post. The counter bore may define a first counter bore and the support arrangement may define a second counter bore arranged on an opposing side of the bore relative to the first counter bore for receiving a head of the fastener. The post may be defined at the ring. The bore and the first and second counter bores may be defined at the insert. This may allow for tightly compressing the upper portion of the flexible side wall within the support arrangement.

In a preferred embodiment, the flexible support arrangement is or includes a substantially rigid support ring that extends along a top of an aquarium tank defined by a flexible substantially transparent side wall whose upper edge is received and/or seats in the ring enabling the tank to be filled with water and the flexible side wall to cooperate with the ring to retain a generally cylindrical side wall shape without requiring any structural support(s) between a base at or adjacent the bottom of the aquarium and the ring. The support ring includes an annular channel in which the top or outer edge of the flexible side wall is received with engagement therebetween fixing the side wall to the ring such that the ring not only retains the generally round aquarium opening it also helps prevent buckling of the flexible side wall thereby enabling the flexible side wall to maintain a desired generally cylindrical tank shape while still being flexible (and without requiring rigid/solid connectors, struts, rods, or the like connecting the ring to a substantially rigid aquarium base).

In one preferred embodiment, the top edge of the flexible side wall is clamped between a pair of generally coaxial rings that form a support ring assembly of substantially rigid flexible side wall supporting construction with the channel in which the top or outer edge of the flexible side wall is received formed where the rings engage one another and the flexible side wall. In such a preferred embodiment, one of the rings nests or seats within another one of the rings forming a support ring assembly that clamps the top of the flexible side wall about the entire top or outer periphery of the tank defined thereby.

The rings are designed to fit together in a manner where they remain assembled once attached to one another. In one preferred embodiment, the rings fit together with snap fit engagement preventing their disengagement. In another preferred embodiment, a friction fit is provided between the rings that keeps them attached to one another and the flexible side wall. In a still further embodiment, a plurality of connectors, such as in the form of pins or the like, can extend axially generally parallel to the flexible side wall coupling one ring of the support ring assembly to the other ring of the support ring assembly. Each coupler or pin is received in generally coaxially aligned ring coupler sockets or receptacles respectively formed in each generally coaxially nested ring holding the rings together.

DRAWING DESCRIPTION

Preferred exemplary embodiments of the invention are illustrated in the accompanying drawings in which like reference numerals represent like parts throughout, and in which.

Figure 1:
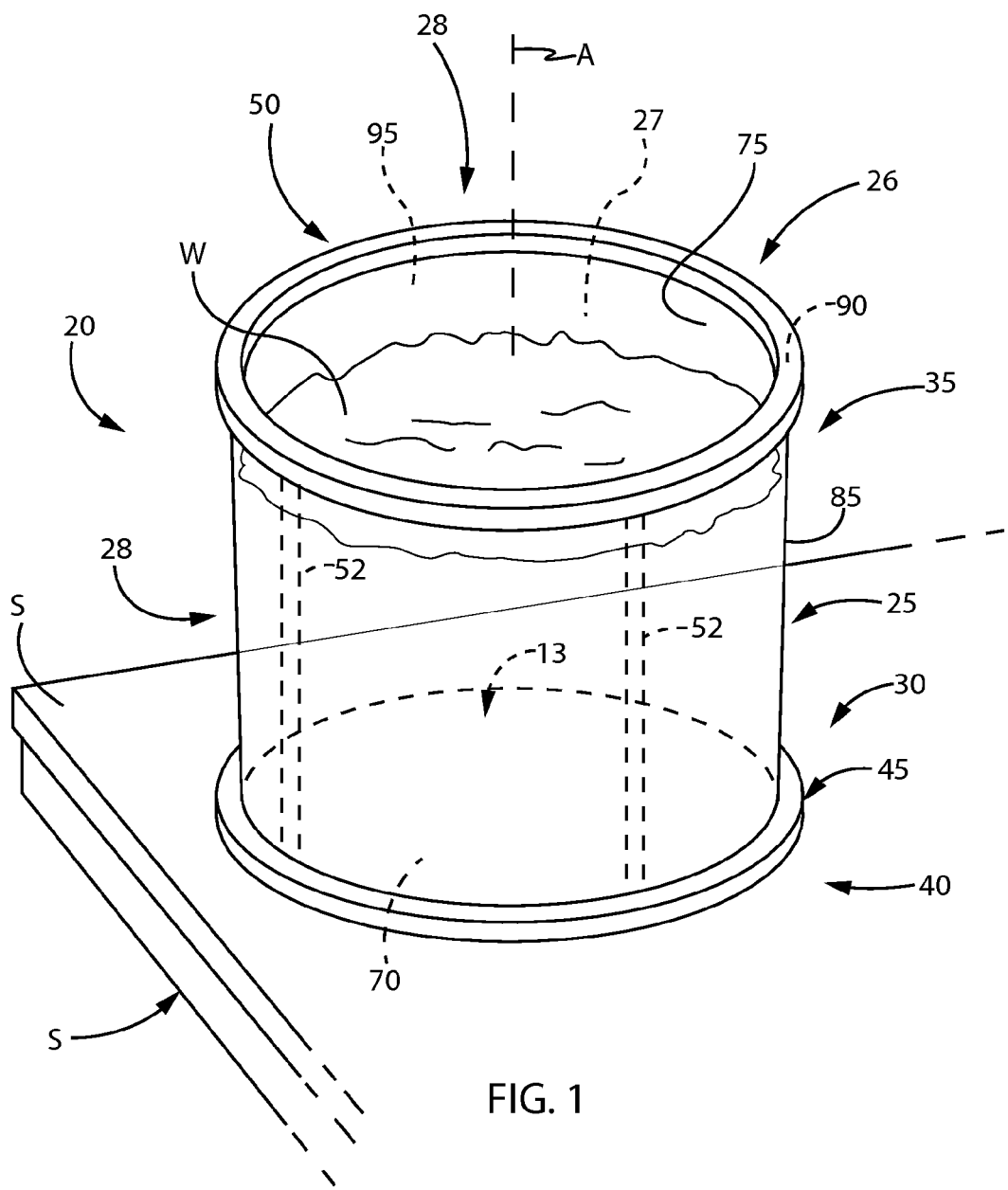
FIG. 1 is a perspective view of an aquarium using a support arrangement in accordance with the present invention.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 2:
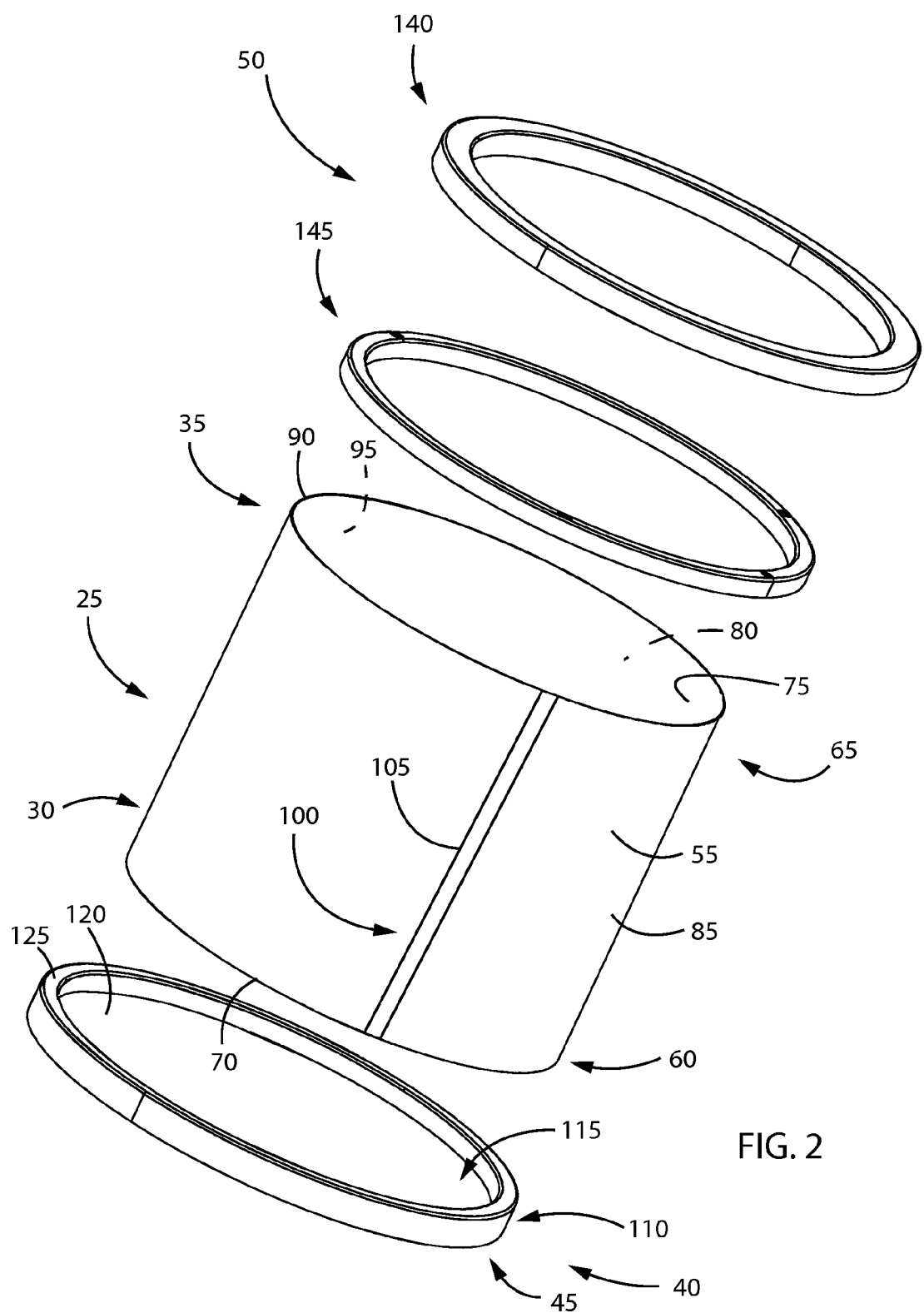
FIG. 2 is a perspective exploded view a variant of the aquarium of FIG. 1.

FIGS. 1 and 2 illustrates an exemplary soft sided aquarium 20 having a flexible main body 25 that can and preferably does define a flexible bag-like liquid holding container 26 with the aquarium 20 having lower and upper ends or portions 30, 35 and a support arrangement 40 that can and preferably does help stabilize the aquarium 20 relative to an underlying support surface "S" that can be a generally planar table top, counter top, floor, ground, or another generally planar or flat support surface. One preferred support arrangement 40 has lower and upper supports 45, 50 stabilizing the flexible main body 25 at the respective lower and upper portions 30, 35, of the flexible main body 25. If desired, the lower and upper supports 45, 50 may be connected to each other by way of one or more generally rigid struts 52 (shown in FIG. 1 in phantom) extending generally vertically and secured opposite ends to the lower and upper supports 45, 50.

Regardless of whether such supports 52 are used, the support arrangement 40 of an aquarium 20 constructed in accordance with the present invention helps keep the flexible main body 25 of the aquarium 20 stable by helping to maintain or even increase the structural rigidity and stability of the flexible main body 25 to resist collapsing of the flexible main body 25 even when subjected to forces such as, bumping, twisting, pressing, pushing, shaking, and/or pulling during use of the aquarium 20, whether the aquarium 20 is full of water "W," such as when serving as an aquatic pet habitat, or empty, such as when used to provide an open space as habitat for non-aquatic pets.

Figure 3:
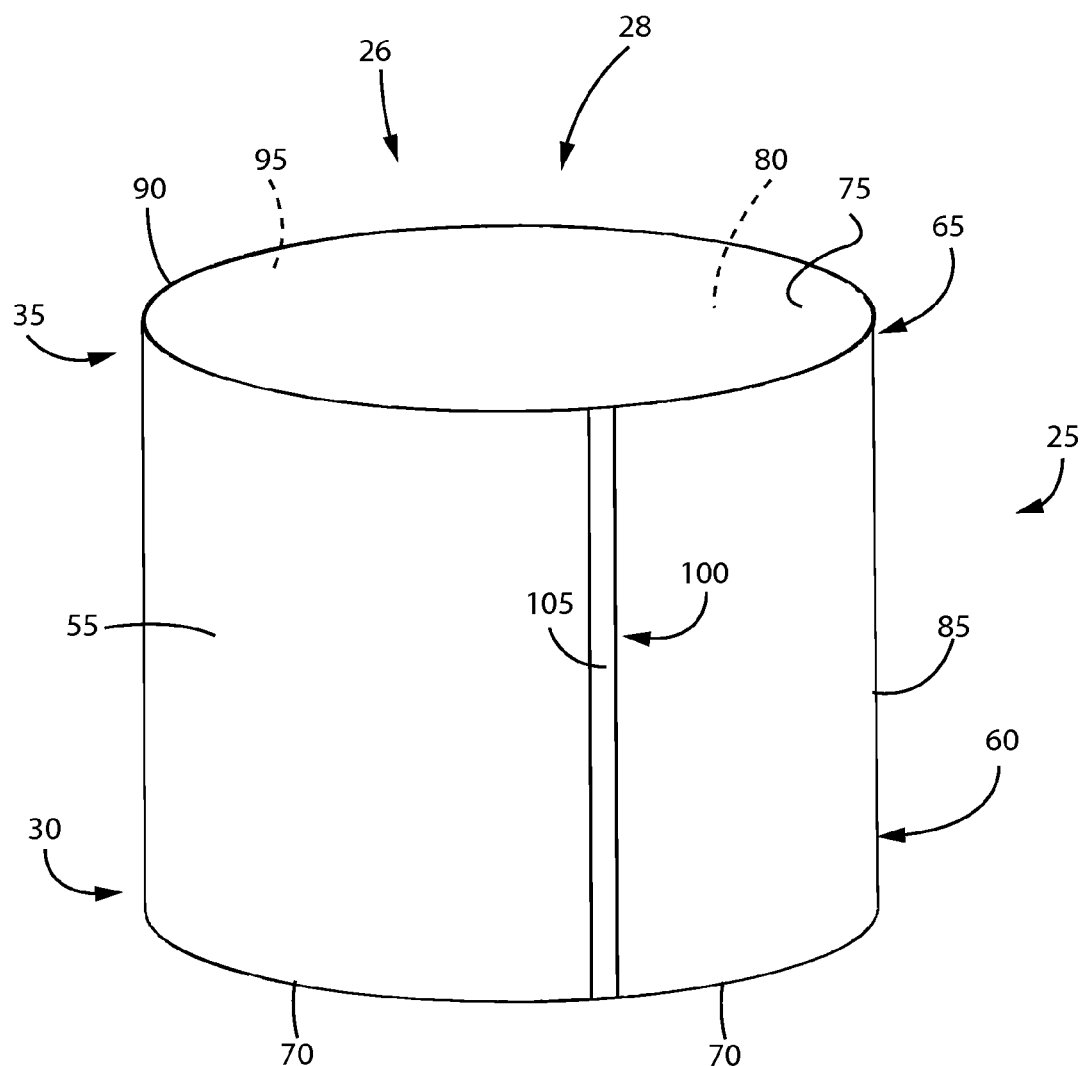
FIG. 3 is a perspective view a flexible main body of the aquarium of FIG. 2.

Referring now to FIG. 3, a preferred flexible main body 25 has a flexible side wall 55 extending upwardly from the lower support 45 that possesses a shape memory tending to want to retain the general shape of the flexible bag-like liquid holding container 26 so as to be at least somewhat self-supporting despite the side wall 55 being so flexible and deformable. The flexible side wall 55 preferably is substantially self-supporting, even when the aquarium 20 is empty, so as to tend to want to self-restore or return to a resting position or operating position when the flexible main body 25 is flexed, twisted, pressed, compressed, compacted, folded, scrunched up, or otherwise urged away from the resting position or operating position. In other words, when released or freed from such side wall deforming stresses or forces, the shape memory of the flexible side wall 55 causes at least the flexible side wall 55 to try to return or self-restore toward the resting or operating position to re-form the flexible bag-like liquid holding container 26 sufficiently so the container 26 will be able to hold water and/or function as a pet enclosure, e.g. terrarium, when used without water.

The resting or operating position of the flexible side wall 55, which preferably also is the resting or operating position of the flexible main body 25, is shown in FIG. 1 in which the flexible side wall 55 extends generally outwardly and preferably upwardly away from the lower support 45 in a tube-like manner to impart a generally upstanding or uprightly extending tubular form to the aquarium 20. The flexible side wall 55 can be of endless construction and can include lower and upper margins 60, 65 respectively located at the lower and upper portions 30, 35 of the flexible main body 25.

In one preferred aquarium embodiment, the flexible side wall 55 can extend upwardly from the lower support 45 with the lower support 45 not only to serving as the base of the aquarium 20 but the lower support 45 also providing a substantially rigid, generally planar, liquid or water-contacting bottom wall of the of the liquid holding container 26.*n*. In such a preferred embodiment, instead of the flexible main body 25 being open only at the top of the upper portion 35, the flexible main body 25 is open at both the top of the upper portion 35 and the bottom of the lower portion 30 with the flexible main body 25 defined by the cylindrical flexible side wall 55 being open at both ends. Such a flexible side wall 55 may be connected to the lower support 45 of the support arrangement 40 (FIG. 2), such as by a liquid-tight connection to one or more portions of the lower support 45, as explained in greater detail elsewhere herein.

In another preferred aquarium embodiment, the preferred flexible main body 25 is provided by a flexible bag-like liquid holding container 26 that includes a flexible liquid or water-contacting bottom wall 70 that is connected at its outer periphery to a lower edge of the lower segment 60 of the flexible side wall 55 defining a flexible, deformable and preferably substantially clear, transparent or see-through aquarium bag 28. In this way, the flexible bottom wall 70 and flexible side wall 55 together define a self-supporting open-topped flexible soft sided aquarium bag 28 that provides a liquid holding container 26 sufficiently deformable so as to be of collapsible construction. Where the liquid holding container 26 is formed of such a tubular open-topped flexible soft sided aquarium bag 28, the lower support 50 of the aquarium support arrangement 40 functions not only as a support base of the aquarium 20 but also serves as a seat 32 in which the aquarium bag 28 seats.

Still referring to FIG. 3, such a preferred flexible main body 25 has flexible side and bottom walls 55 and 70 forming a flexible bag 28 made of a flexible material of substantially transparent construction, such as the flexible substantially clear material, e.g., PVC or polyvinyl chloride, disclosed below, with the flexible bag being held, supported, and/or anchored at or near the aquarium 20 bottom by the lower support 45 and at or near the aquarium 20 top by a generally annular support arrangement provided by the upper support 50. The flexible side wall 55 may be made from a material with sufficient columnar strength to allow the flexible side wall 55 to maintain the resting position when arranged in a tubular, preferably cylindrical, configuration. In one embodiment, the flexible side wall 55 may be sufficiently strong to maintain an upright form when the aquarium is empty. A suitable material is a PVC-based material with sufficient resiliency to restore the flexible side wall 55 to the resting or operating position including after being collapsed during shipment and/or storage.

In a preferred embodiment, the flexible aquarium side wall 55 is made of polyvinyl chloride, i.e., PVC, or another suitable flexible clear material that can be of polymeric, plastic and/or elastomeric composition having a cross-sectional thickness of at least a plurality of mils that has a thickness in at least one preferred embodiment of between about 1 mil thick and about one quarter inch thick (250 mils). One preferred flexible side wall 55 is made of a PVC material, preferably PVC, and has a cross-sectional thickness of about 200 mils or about 0.5 mm (±4 mills/0.1 mm). The shape memory characteristics of the material of the flexible side wall 55 along with the tubular configuration of the flexible side wall 55 enables the flexible side wall 55 to flex from the resting or operating position inwardly toward a longitudinal axis "A" (FIG. 1) of the aquarium 20 as well as downwardly from the resting position toward the base or lower support 45 while thereafter being able to be resiliently restored to the resting or operating position after such flexing.

Referring now to FIGS. 1-3, the flexible side wall 55 has an inner surface 75 defining an inner periphery of a cavity 80 of the aquarium 5 which can hold water "W" (FIG. 1) in which aquatic pets may live or provide an open space in which non-aquatic pets may live. The flexible side wall 55 has an outer surface 85 opposite the inner surface 75 that faces away from the cavity 80 of the aquarium 20. An upper edge 90 (FIGS. 2 and 3) of the flexible side wall 55 is anchored to part of the support arrangement 40, preferably the upper support 50 (FIGS. 1 and 2), in a manner that helps not only reinforce the upper edge 90 of the flexible side wall 55 but which also helps maintain shape and structural integrity of the aquarium 20 helping to enable it to return to its resting or operating position after the side wall 55 has been collapsed.

With the upper edge 90 received and held in the upper support 50, the upper support 50 helps the flexible side wall 55 maintain a desired shape of an opening 95 of the aquarium 20 defined interiorly of the upper edge 90 of the flexible side wall 55. As shown in FIGS. 1-2, the desired shape of the opening 95 is maintained by the upper support 50 with the shape of the opening 95 preferably substantially corresponding to the substantially rigid upper support 50. In the preferred upper support embodiment shown in FIGS. 1 and 2, engagement of the upper edge 90 of the flexible side wall 55 with the substantially rigid and generally circular upper support 50 not only maintains a generally circular aquarium opening 95 but also serves to reinforce the upper edge 90 of the flexible side wall 55.

The upper edge 90 of the flexible side wall 55 engages the upper support 50 in a manner that fixes it thereto which prevents the upper edge 90 from being folded over itself thereby preventing an part of the upper portion 35 of the flexible side wall 55 from buckling in a manner that would allow water "W" to spill out of the opening 95, as explained in greater detail elsewhere herein. As such, the upper support 50 provides a generally planar top of the aquarium 20 is maintained by being fixed to the upper edge 90 of the flexible side wall 55 that not only helps structurally support and even rigidify the flexible side wall 55, the upper support 50 advantageously serves as a spill-preventing aquarium rim encircling the entire periphery of the aquarium opening 95.

Other preferred embodiments of the flexible main body 25 of an aquarium 20 constructed in accordance with the present invention can be configured in ways that provide other, noncircular perimeter shapes to the opening 95. These may include a triangular, rectangular, other polygon, or irregular perimeter shapes to the opening 95, which are surrounded by like-shaped implementations of the upper support 45. More particularly, other preferred aquarium embodiments can be configured with an upper support 50 having an oval, triangular, square, rectangular or other polygonal shape which in turn imparts a corresponding oval, triangular, square, rectangular or other polygonal shape to the opening 95 of the aquarium 20.

Referring now to FIGS. 2 and 3, regardless of the particular cross-sectional shape of the flexible main body 25 and corresponding perimeter shape of the opening 95, the flexible main body 25 can be formed as a singular extrusion molding, or can be assembled from multiple components. One preferred flexible main body 25 is formed from a flat rectangular sheet of material, such as PVC, which is arranged into a generally cylindrical shape having portions along opposite side edges overlapping defining an overlap segment 100 where those portions along opposite side edges are fixed to one another. Where overlapped, the overlapped portions can be ultrasonically welded, heat sealed, glued, or otherwise bonded to one another along the overlap segment 100 to form the desired cylindrical shape of the flexible main body 25. Where not overlapped, the opposite side edges of the sheet can be joined together in a similar manner to form the desired cylindrical shape of the flexible main body 25.

Referring now to FIG. 2, the support arrangement 40 and its components such as the lower and upper supports 45, 50 are made from a material(s) that is more rigid than that of the flexible side walls 55, such as any one of a variety of substantially rigid plastic, substantially rigid polymeric or other substantially rigid materials. One preferred lower support 45 provides a base 110 that defines a tray 115 that receives and supports the bottom of the lower end 30 of the flexible main body 25 for supporting the aquarium 20 with respect to the underlying support surface "S." Where the flexible main body 25 is formed of a flexible aquarium bag 28 having a flexible side wall 55 and a flexible bottom wall 70, the lower support 45 provides a base 110 that also serves as a tray 115 that receives and underlies the flexible bottom wall 70.

Figure 4:
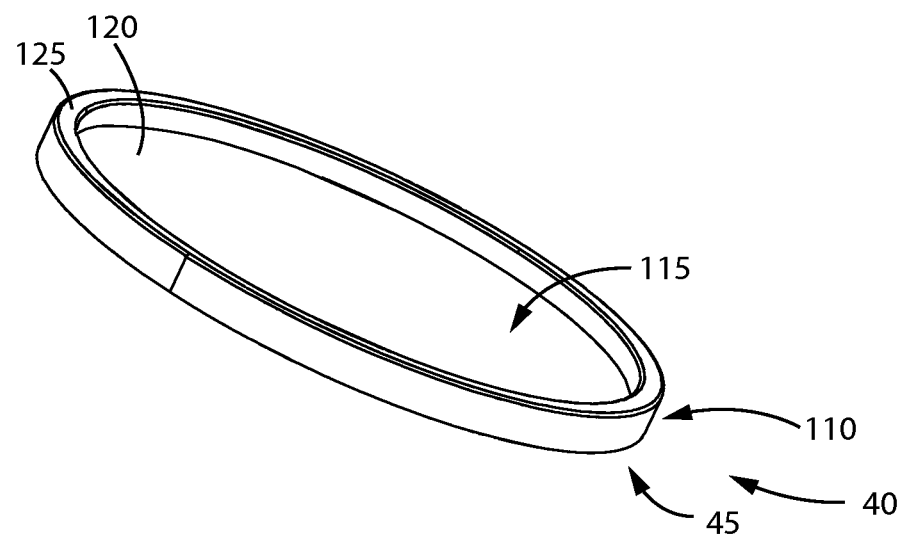
FIG. 4 is a perspective view from above of a lower support of the aquarium of FIG. 2.

Referring now to FIG. 4, the base 110 includes a generally flat bottom wall 120 having an upper surface that defines an upper surface of the tray 115. The bottom wall 120 extends along a plane parallel to the underlying support surface "S" as a continuous web across the base 110. The base 110 includes a collar 120 extending upwardly about the periphery of the base 110 that provides a lip or shoulder that preferably is disposed outboard of the lower portion 30 of the flexible main body 25 or bag 28 defining a seat in which the bottom wall 70 of the bag 28 is received. Where the base 110 is circular, the lip or shoulder of the collar 120 extends upwardly as an annular projecting bounding or encircling the bottom wall 70 as well as part of the lower portion 30 of the bag 28 helping to concentrically locate and retain the lower portion 20 of the bag 28 in place.

Where the flexible main body 25 lacks bottom wall 70 the collar 120 of the base 110 is configured to anchor the bottom portion 30 to the base 110 in a manner substantially the same as how the upper support 50 anchors the top portion 35 thereto.

Figure 5:
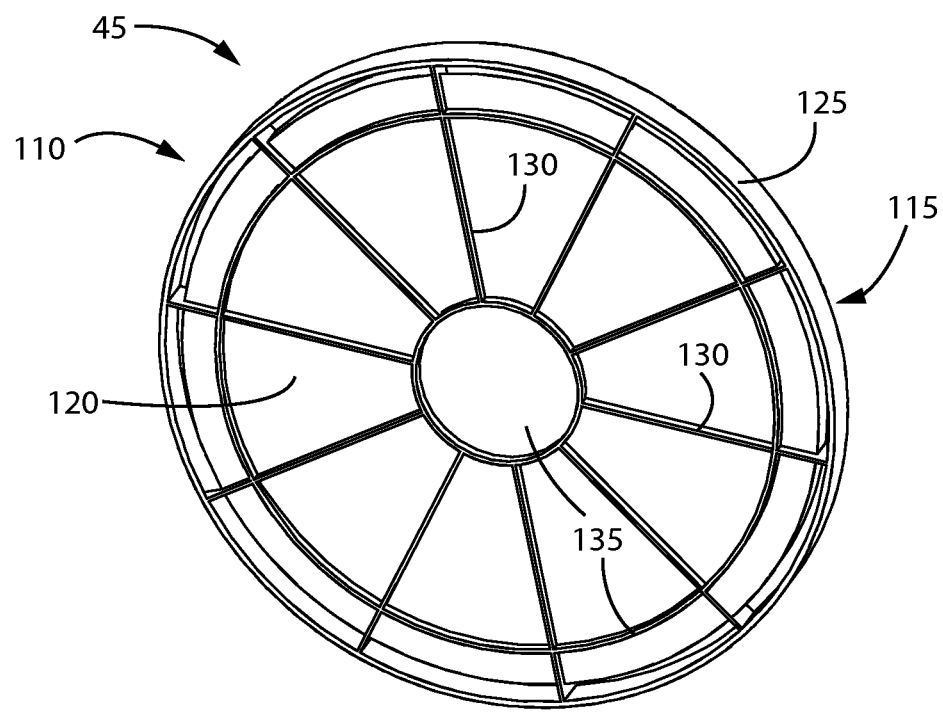
FIG. 5 is a perspective view from below of the lower support of FIG. 4.

In one preferred embodiment, the bottom portion 30 can be anchored by attaching the lower segment 60 of the flexible side wall 55 to an inner surface, such as an inner circumferential surface of the collar 120, in a water tight manner that prevents water from leaking therebetween near the bottom of the aquarium 20. Referring now to FIG. 5 showing the bottom side of the lower support 45, one preferred base 110 has a lower or downwardly facing surface of the bottom wall 120 spaced from the underlying support surface "S" (FIG. 1). This is done with raised ribs 130 and raised rings 135 that project outwardly from the lower surface of the bottom wall 120 so as to elevate the bottom wall 120 by providing edges of the raised ribs and rings 130, 135 as the interfacing surface(s) that engages the underlying support surface "S" (FIG. 1).

Referring again to FIG. 2, as shown, the upper support 50 of the support arrangement 40 preferably is formed of a nested anchor arrangement formed of a pair of nesting retainers 140 and 145 that clamp part of the flexible side wall 55 adjacent or along its upper edge 95 therebetween when the retainers 140 and 145 are nested one within the other. In a preferred embodiment, one of the nested retainers is a first ring 140 and the other one of the nested retainers 145 is a second ring that can function as an insert that nests within the first ring 140 when assembled together to form the upper support 50. As is best shown in FIGS. 10-13, the first ring 140 is disposed on top with the second ring 145 nesting within the first ring 140 from the bottom thereby clamping an annularly extending portion of the flexible side wall 55 extending below its upper edge 90 between opposed radial surfaces of the nested rings 140, 145. The clearance between the opposed radial surfaces of the nested rings 140, 145 preferably clamps the portion of the flexible side wall 55 therebetween providing an interference fit therewith that frictionally anchors the side wall 55 to the upper support 50 fixing it thereto.

Figure 6:
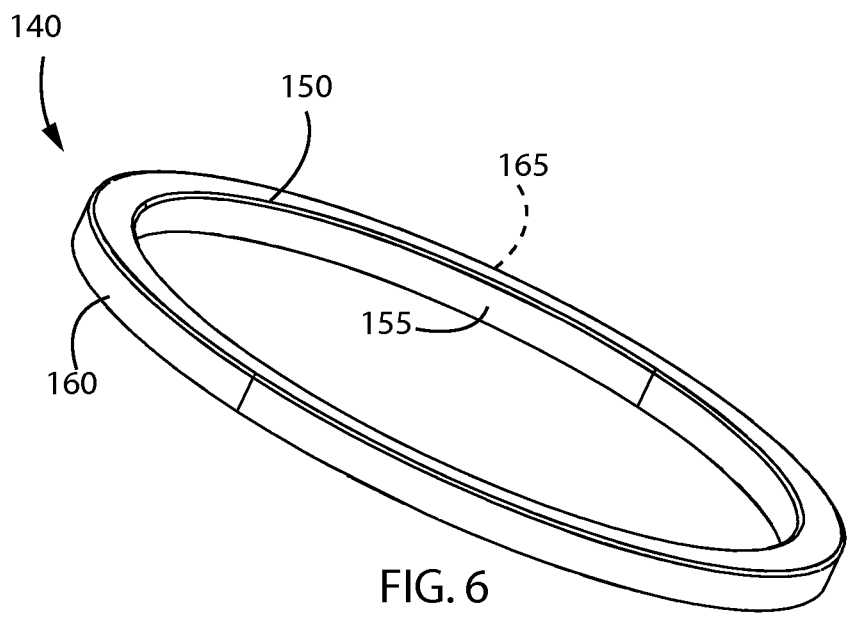
FIG. 6 is a perspective view from above of a ring of an upper support of the aquarium of FIG. 2.
Figure 7:
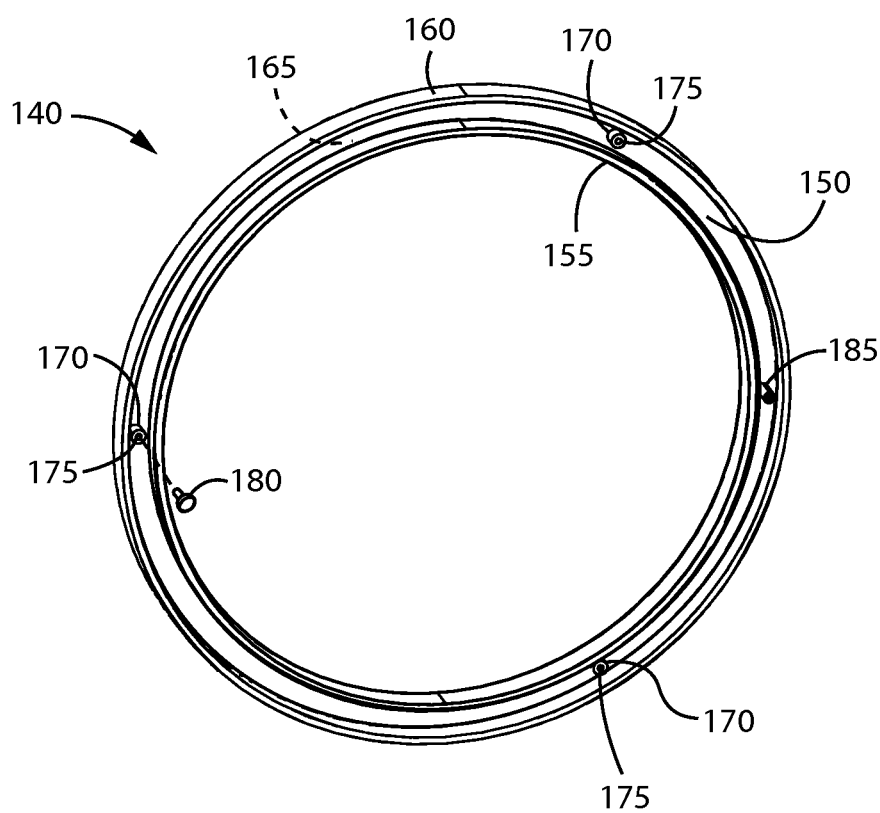
FIG. 7 is a perspective view from below of the ring of the upper support of FIG. 6.

The first ring, ring 140 and the second ring, insert 145, are arranged with respect to each other to support the upper edge 90 of the side wall 55. Referring now to FIG. 6, in this embodiment, the ring 140 has a top wall 150 with an inner wall 155 and an outer wall 160 extending from inner and outer perimeters of the top wall 150. Inner and outer walls 155, 160 extend parallel to and spaced from each other defining a cavity 165 therebetween. FIG. 7 shows the bottom side of the ring 140 with the cavity 165 providing an annular recess into the ring 140 from below. Multiple projections or posts extend downwardly from a lower surface of the top wall 150, into the cavity 165. Some of the posts defined screw bosses 170 with cylindrical bodies having axially extending blind bores 175 for receiving fasteners 180, only one of which is shown. In a preferred ring 140, one of the posts is an alignment post 185, configured to facilitate aligning the ring 140 with the insert 145.

Figure 8:
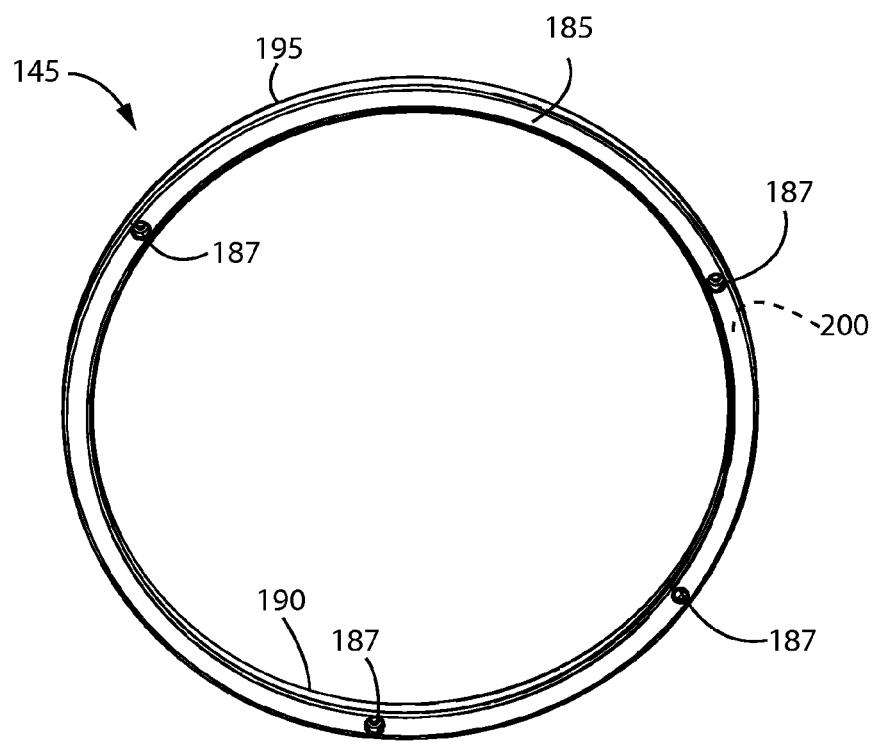
FIG. 8 is a perspective view from above of an insert of an upper support of the aquarium of FIG. 2.
Figure 9:
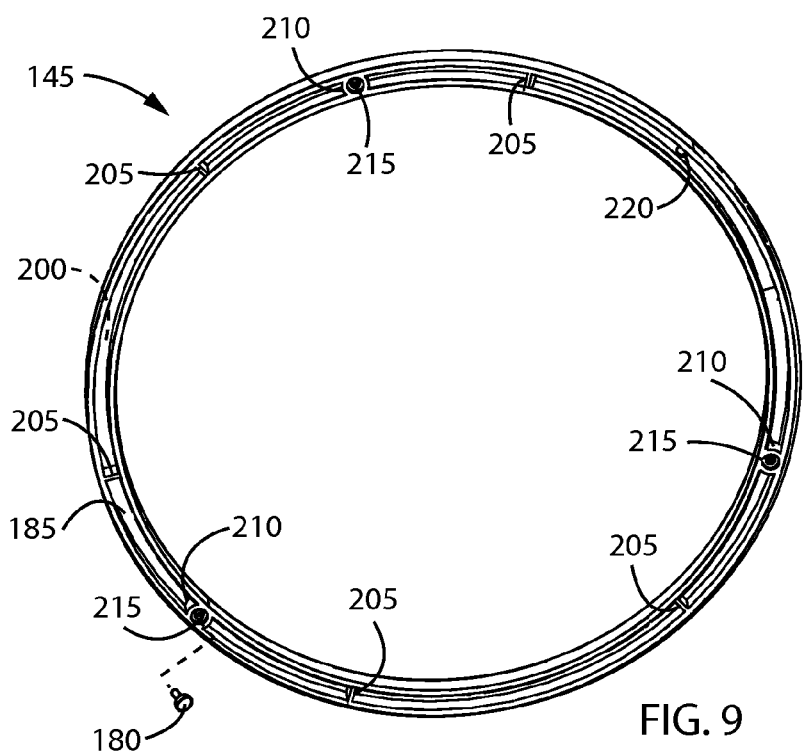
FIG. 9 is a perspective view from below of the insert of the upper support of FIG. 8.

Referring now to FIG. 8, one preferred insert 145 provides a ring-shaped insert 145 that is concentrically received between the inner and outer walls 155, 160 of the ring 140 (FIG. 7), within the cavity 165. The ring-shaped insert 145 has a top wall 185 with recessed pockets 187 extending inwardly into the insert 145 from the top outer surface of the top wall 185 that are configured to receive the screw bosses 170 of the ring 140 (FIG. 7). Insert 145 further includes an inner wall 190 and an outer wall 195 extending from inner and outer perimeters of the top wall 185. Inner and outer walls 190, 195 extend parallel to and spaced from each other defining a cavity 200 therebetween. FIG. 9 shows the bottom side of the insert 145 with the cavity 200 divided into segments by bridges 205 extending transversely between the inner and outer walls 190, 195. Blocks 210 also extend between the inner and outer walls 190, 195 and include bores 215 that receive fasteners 180. Each block 210 may include a counter bore at the downwardly facing end of the bore 215 to allow countersinking of the fastener 180 so that its end or head lies flush with an outer surface of the block 210. Another bore through the insert 145 provides an alignment bore 220 for receiving the alignment post 185 of the ring 140 (FIG. 7). Receipt of the alignment post 185 into the alignment bore 220 provides proper rotational alignment or clocking of the insert 145 within the ring 140 so that the bores 215 of the blocks 210 in the insert 145 align with the blind bores 175 of the ring 140.

Figure 10:
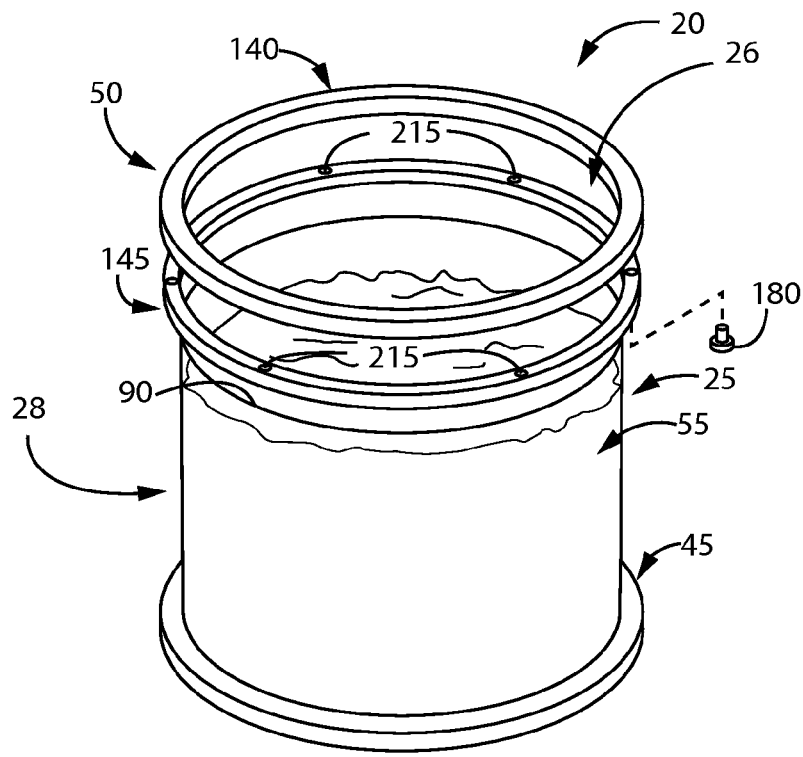
FIG. 10 is a perspective exploded view of the aquarium of FIG. 1.
Figure 11:
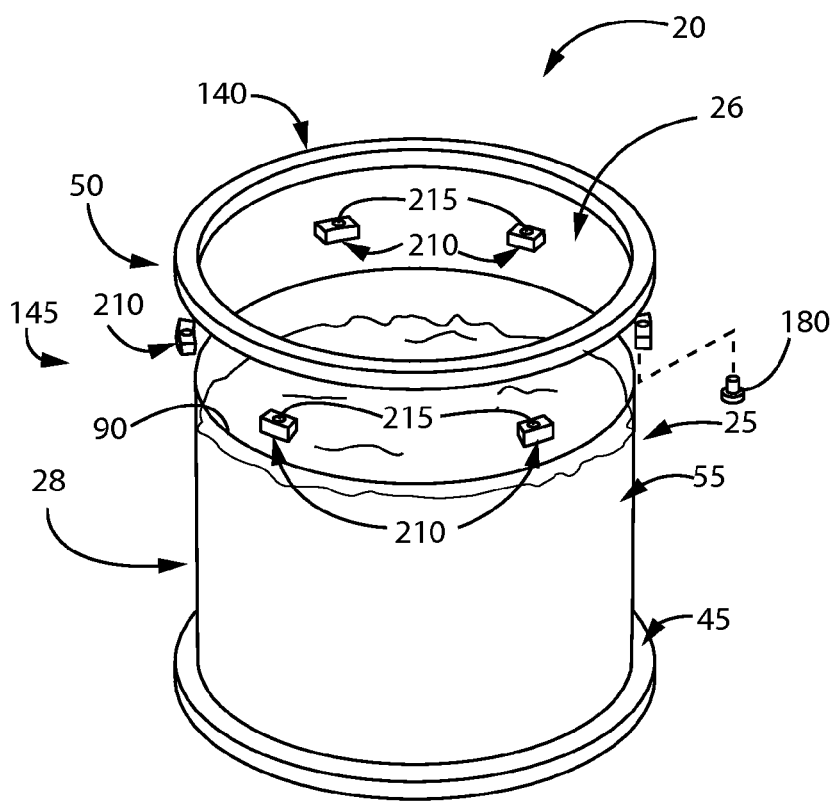
FIG. 11 is a perspective exploded view of a variant of the aquarium of FIG. 10.

Referring now to FIG. 10, the aquarium 20 can be assembled by placing the flexible main body 25 into the lower support 45 and securing the upper support 50 with respect to the upper edge 90 of the flexible wall 55 to lock it into a rigid form. When the insert 145 defines a ring-shaped insert 145, the bores 215 of the insert 145 are aligned with the blind bores 175 (FIG. 7) of the ring 140 and the insert 145 is received into the cavity 165 (FIG. 7) of the ring 140. Fasteners 180 are inserted through the bores 115 of the insert 145 and tightened into the blind bores 175, securing the insert 145 relative to the ring 140 to provide an interlocking arrangement of the upper support 50 capturing the upper edge 90 of the flexible side wall 55. This allows the upper support 50 to provide stabilization in multiple directions, including stabilization in opposing directions that are transverse with respect to a longitudinal axis of the flexible side wall 55. In another preferred upper support 50, the insert 145 is not a single unitary ring-shaped insert but is instead provided as multiple separate inserts 145 defining discrete blocks 215 accepting fasteners 180 therethrough and into the blind bores 175 (FIG. 7) at the corresponding blind bore 175 locations of ring 140.

Figure 12:
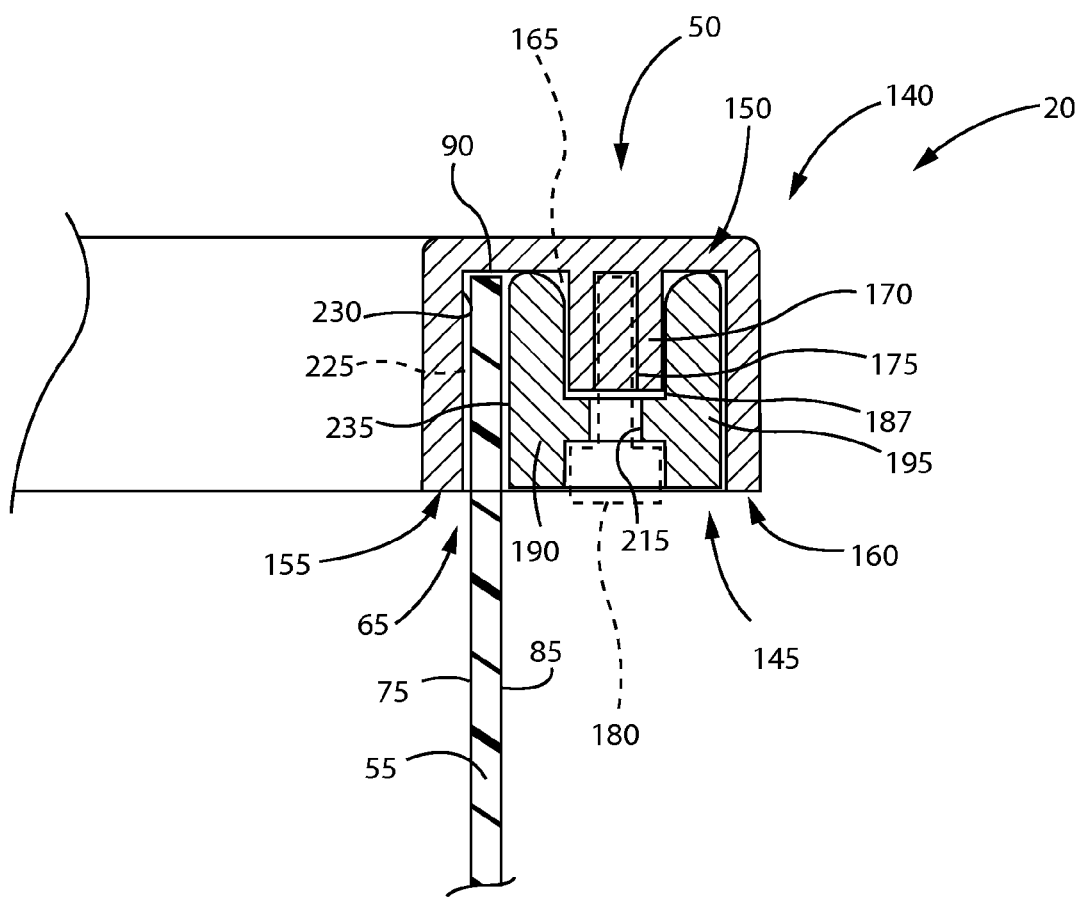
FIG. 12 is a cross-sectional view of a an upper support in accordance with the present invention.

Referring now to FIG. 12, in one preferred upper support 50, each screw boss 170 of the ring 140 is concentrically received into the pocket 187 of the insert 145, allowing the upper surface of top wall 185 of the insert 145 to abut the lower surface of the top wall 150 of the ring 140, with spaced apart interlocks defined by the male/female interconnection of the screw bosses and pockets 170, 187. The upper portion 65 of the flexible side wall 55 is captured which may include being held snugly, in compression, or by way of friction fit in a space 225 between a first support surface 230 defined by an outwardly facing surface of the inner wall 155 of ring 140, and a second support surface 235 defined by an inwardly facing surface of the inner wall 190 of the insert 145.

Figure 13:
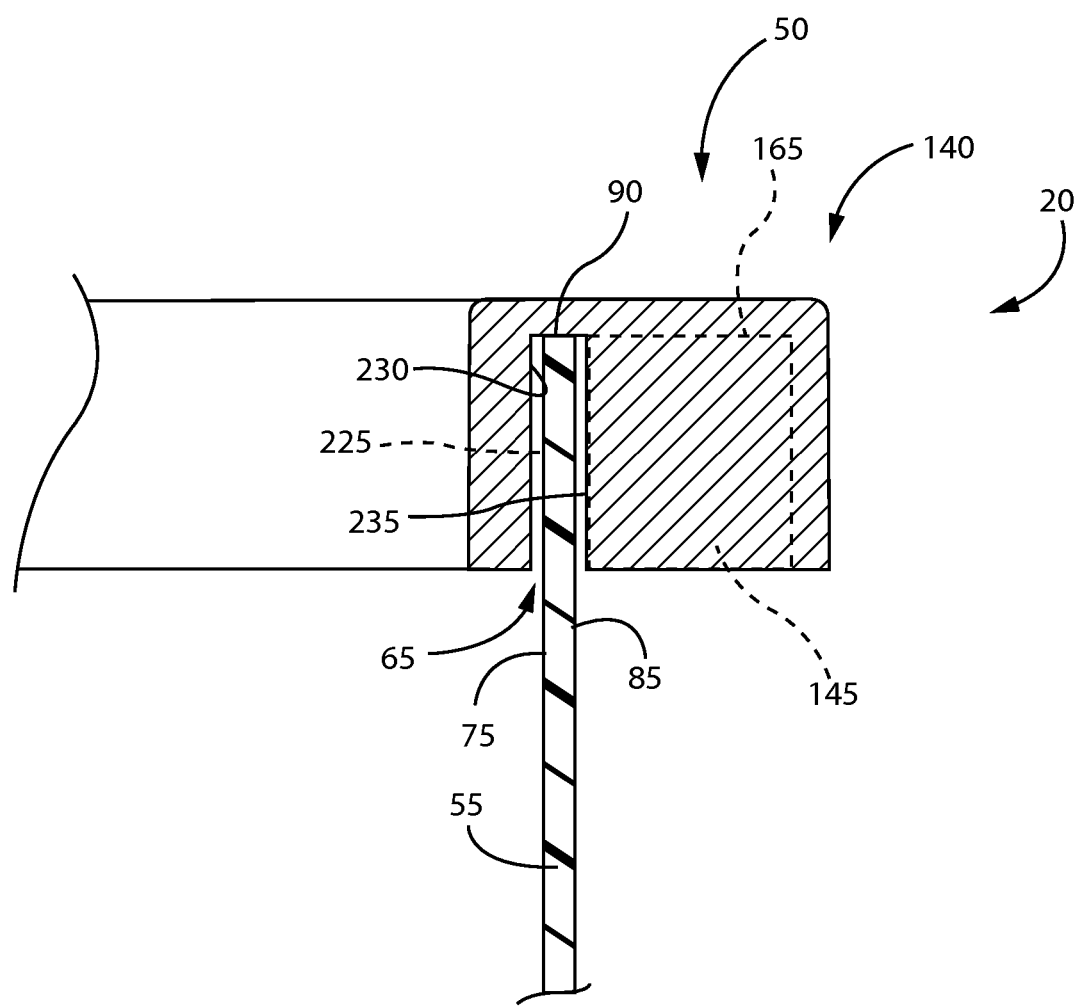
FIG. 13 is a cross-sectional view of a variant of the upper support of FIG. 12

Referring now to FIG. 13, in this embodiment, the space 225 is defined by a groove extending upwardly into a bottom surface of the ring 140. In this way, the first and second support surfaces 230, 235 are both provided on the ring 140 on opposite sides of the space 225. This allows for attaching the upper support 50 to the flexible side wall 55 without requiring fasteners 180 by pressing the ring 140 over the upper edge 90 of the side wall 55 so that the upper portion 65 is received into the space 225. In another embodiment that does not require fasteners 180, the insert 145 is press fit into the cavity 165 of ring 140 to capture the upper portion 65 of the side wall 55, similar to the arrangement of the ring 140 and insert 145 of FIG. 12. This is shown by insert 145 represented in outline form in FIG. 13. The insert 145 in this embodiment can be maintained within the ring 140 by way of friction fit for a snap lock engagement.

Figure 14:
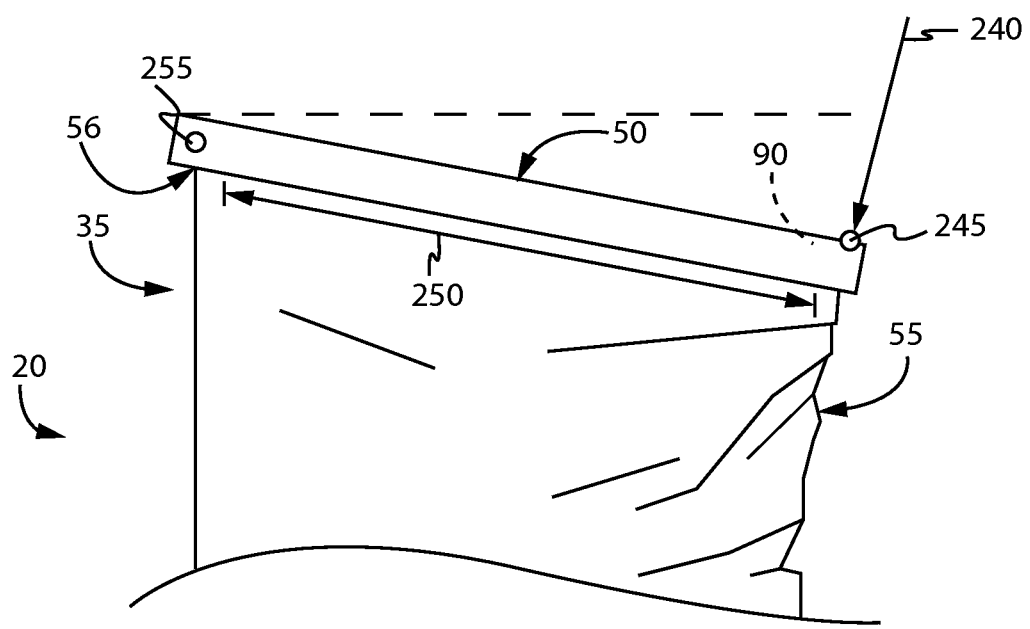
FIG. 14 is a simplified side elevation of a portion of the aquarium of FIG. 1 under an application of a localized force to the upper edge of the flexible side wall of the aquarium.

Referring now to FIG. 14, when the upper portion 65 of the flexible side wall 55 is locked into the upper support 50, the upper support 50 locks different segments of the upper portion 65 with each other, enhancing stability of the upper portion 35 of the main body 25. In this way, the upper support 50 maintains the perimeter shape of opening 80 (FIG. 1), and distributes a force 240 applied to a discrete location 245 of the side wall 55 across a relatively larger segment of the side wall 55, represented by arrow 250, than at the discrete location 245. This prevents localized buckling of the side wall 55 at its upper edge 90. Instead, application of a force 240 at a discrete location 245 of the side wall 55 tends to distribute the force about a substantial portion of the circumference of the side wall 55. This allows the upper support 50 and upper edge 90 of the side wall 55 to pivot about a position 255 that is opposite the discrete location 245 of the application of force 240 which may create wrinkling and compression of the side wall 55 below the discrete location two and 45 in preference to a localized buckling of the upper edge 90 at the discrete location 245.

Figure 15:
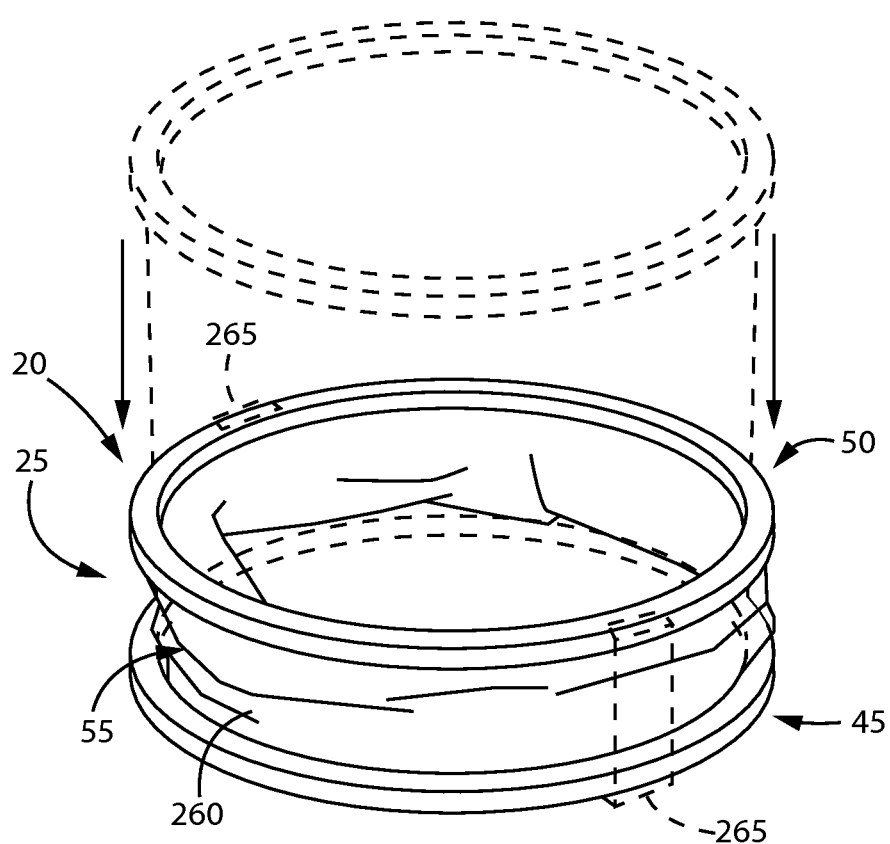
FIG. 15 is a simplified perspective view the aquarium of FIG. 1 in a temporary collapsed configuration.

Referring now to FIG. 15, one preferred flexible main body 25 allows for temporary collapsing and compression storage of the aquarium 20 even though the flexible side wall 55 is self-supporting so as to resiliently self-restore to a resting position. The flexible main body 25 is shown self-supporting in an extended in-use configuration of the aquarium 20 in phantom dashed-outline. The flexible main body 25 can be folded down for collapsing the aquarium 20 from the extended in-use configuration to a temporary collapsed configuration of the aquarium 20 as shown in solid outline. Folding the flexible main body 25 down from the extended in-use configuration to the collapsed configuration of the aquarium 20 can be done by pushing downwardly on an upper portion 35 of the flexible main body 25 toward a lower portion 30 of the flexible main body 25. A slight rotating of the upper portion 35 relative to the lower portion 30 of the main body 25 while pushing downwardly on the upper portion 35 may facilitate segmented folding of the flexible main body 25 to create piled, folded, or overlapped mass 260 of the side wall 55 while the aquarium 20 is in the collapsed configuration. The aquarium 20 can be maintained in the collapsed configuration by way of retainers such as clips 265 to maintain the lower and upper support 45, 50 near each other, overcoming the biasing force provided by the side wall 55 tending to resiliently restore itself to an extended self-supporting configuration. The aquarium 20 in the collapsed configuration is sufficiently reduced in height relative to the height in the extended in-use configuration such as by a height reduction of at least about 60% when held vertically compressed to allow for substantially flat shipping and/or storage.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. An aquarium comprising:
   a base for supporting the aquarium with respect to an underlying support surface;
   a flexible side wall extending upwardly from the base having an inner surface facing into a liquid-holding cavity of the aquarium, an outer surface facing away from the liquid-holding cavity of the aquarium, and an upper portion that includes an upper edge of the flexible side wall; and
   a side wall support arrangement comprising (a) an upper support extending about the upper portion of the flexible side wall, the upper support having an outer wall disposed outwardly of the outer surface of the flexible side wall and an inner wall disposed inwardly of the inner surface of the flexible side wall, (b) at least one insert received between the inner wall and outer wall of the upper support and defining a space between the upper support and the at least one insert in which the upper portion of the flexible side wall is received, (c) a blind bore formed in one of the upper support and the at least one insert that extends alongside the upper portion of the flexible side wall toward the other one of the upper support and the at least one insert and which is aligned with at least one bore formed in the other one of the upper support and the at least one insert that extends alongside the upper portion of the flexible side wall, and (d) a fastener extending alongside the upper portion of the flexible side wall that is received in the at least one blind bore and in the at least one bore aligned therewith securing the upper support to the at least one insert with the upper portion of the flexible side wall retained therebetween.

2. The aquarium of claim 1 wherein the upper portion of the flexible side wall is retained between the upper support and the at least one insert by frictional engagement.

3. The aquarium of claim 2 wherein the upper portion of the flexible side wall is retained between the upper support and the at least one insert by being clamped therebetween.

4. The aquarium of claim 3 wherein at least one of the upper support and the at least one insert comprises a ring.

5. The aquarium of claim 4 wherein the upper support is formed of a first ring that overlies the upper edge of the flexible side wall, and the at least one insert is comprised of a second ring that nests in the first ring.

6. The aquarium of claim 5 wherein the flexible side wall is of endless and generally cylindrical construction.

7. The aquarium of claim 6 wherein the second ring is disposed outwardly of the outer surface of the flexible side wall.

8. The aquarium of claim 1 wherein the at least one insert defines a single unitary insert extending about an entire periphery of the flexible side wall.

9. The aquarium of claim 7 wherein the sidewall support arrangement includes (a) a plurality of spaced apart blind bores formed in one of the first and second rings with each one of the blinds bores aligned with a respective bore formed in the other one of the first and second rings, and (b) a fastener received in each bore and blind bore aligned therewith.

10. The aquarium of claim 1 wherein the blind bore is defined in a post at one of the ring and the insert and extends toward the other one of the ring and the insert.

11. The aquarium of claim 10 wherein the support arrangement defines a counter bore receiving the post.

12. The aquarium of claim 11 wherein the counter bore defines a first counter bore and the support arrangement defines a second counter bore arranged on an opposing side of the bore relative to the first counter bore for receiving a head of the fastener.

13. The aquarium of claim 12 wherein the post is defined at the ring and the bore, and the first and second counter bores are defined at the insert.

14. The aquarium of claim 1 wherein the flexible side wall is flexible from a resting position inwardly toward a longitudinal axis of the aquarium and downwardly from the resting position toward the base, the flexible side wall being self-supporting so as to self-restore to the resting position after flexing inwardly toward the longitudinal axis and downwardly toward the base.

15. The aquarium of claim 1 further comprising flexible bottom wall connected to a lower portion of the flexible side wall such that the flexible bottom wall and flexible side wall form a flexible liquid holding container.

16. The aquarium of claim 1 further comprising a flexible bottom wall connected to a lower portion of the flexible side wall such that the flexible bottom wall and flexible side wall together provide a flexible liquid holding bag.

17. The aquarium of claim 1 wherein the flexible side wall is foldable for collapsing the aquarium from an extended in-use configuration of the aquarium to a collapsed configuration of the aquarium.

18. An aquarium comprising:
a flexible side wall having an upper portion terminating in an upper edge; and
a side wall support arrangement comprising (a) a support ring having an inner wall disposed on one side of the upper portion of the flexible side wall, and an outer wall that is generally parallel to the inner wall and disposed on an opposite side of the upper portion of the flexible side wall, (b) at least one insert disposed alongside the upper portion of the flexible side wall, the at least one insert located between the inner wall and the outer wall of the support ring, (c) a blind bore formed in a post of one of the support ring and the at least one insert that extends toward the other one of the support ring and the at least one insert and is aligned with a bore of the other one of the support ring and the at least one insert, and (d) a fastener extending through the bore into the blind bore securing the support ring and the at least one insert to one another retaining the upper portion of the flexible side wall between the support ring and the at least one insert.

19. The aquarium of claim 18 further comprising a counter bore formed in the other one of the support ring and the at least one insert that receives the post when then fastener is extended through the bore into the blind bore.

20. The aquarium of claim 18 further comprising (a) a first counter bore formed in the other one of the support ring and the at least one insert that receives the post, and (b) a second counter bore formed in the other one of the support ring and the at least one insert that is aligned with and spaced from the first counter bore, the second counter bore receiving a head of the fastener when the fastener is extended through the bore into the blind bore.

21. The aquarium of claim 18 wherein the bore, blind bore, and fastener are disposed alongside the upper portion of the flexible side wall.

22. The aquarium of claim 21 wherein the bore, blind bore, and fastener extend generally parallel to the upper portion of the flexible side wall.

23. The aquarium of claim 22 wherein the fastener comprises a screw that is threadably received in the blind bore.

24. The aquarium of claim 18 wherein the support ring overlies the outer edge of the upper portion of the flexible side wall and the at least one insert comprises a clamping ring that generally coaxially nests within the support ring clamping the upper portion of the flexible side wall between the support ring and the clamping ring.

25. The aquarium of claim 24 wherein the clamping ring is disposed radially outwardly of the upper portion of the flexible side wall.

26. The aquarium of claim 18 wherein the flexible side wall is of endless generally cylindrical construction defining a liquid-holding container of collapsible construction that maintains a generally cylindrical shape when filled with water and which is collapsible when empty.

27. The aquarium of claim 26 wherein the liquid-holding container comprises a flexible collapsible water-holding bag.

28. The aquarium of claim 27 further comprising a substantially rigid base underlying a bottom of the liquid holding container.

29. An aquarium comprising:
a generally cylindrical and substantially transparent flexible side wall of imperforate and endless construction having (a) an inner surface facing toward a liquid-holding container defined by the flexible side wall, and (b) an outer surface disposed exteriorly of the liquid-holding container facing away from the liquid-holding container, the flexible side wall having an upper portion terminating in an upper edge; and
a side wall support arrangement comprising (a) a first support ring having an inner wall disposed on one side of the upper portion of the flexible side wall and an outer wall disposed on an opposite side of the upper portion of the flexible side wall that is generally parallel to the inner wall, (b) a second support ring disposed exteriorly of the liquid-holding container, the second support ring disposed alongside and outwardly of the upper portion of the outer surface of the flexible side wall and located in between the inner wall and the outer wall of the first support ring, (c) a blind bore formed in one of the first support ring and the second support ring that is generally parallel with the upper portion of the flexible side wall and is aligned with a bore of the other one of the first support ring and the second support ring that is generally parallel with the upper portion of the flexible side wall, and (d) a fastener extending generally parallel to the upper portion of the flexible side wall that is received in the bore and blind bore securing the first support ring to the second support ring clamping the upper portion of the flexible side wall between the first support ring and the second support ring.

\* \* \* \* \*